US012722456B2

(12) United States Patent
Snider et al.

(10) Patent No.: US 12,722,456 B2
(45) **Date of Patent: *Sep. 1, 2026**

(54) VEHICULAR REAR WINDOW ASSEMBLY WITH CONTINUOUS HEATER TRACE

(71) Applicant: Magna Mirrors of America, Inc., Holland, MI (US)

(72) Inventors: Darin J. Snider, Holland, MI (US); David L. Guillozet, Hamilton, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 159 days.

This patent is subject to a terminal disclaimer.

(21) Appl. No.: 18/791,654

(22) Filed: Aug. 1, 2024

(65) Prior Publication Data

US 2024/0391302 A1 Nov. 28, 2024

Related U.S. Application Data

(63) Continuation of application No. 16/947,542, filed on Aug. 6, 2020, now Pat. No. 12,054,035.

(60) Provisional application No. 62/884,188, filed on Aug. 8, 2019.

(51) Int. Cl.

| | |
|---|---|
| ***B60J 1/00*** | (2006.01) |
| ***B60J 1/18*** | (2006.01) |
| ***H05B 3/84*** | (2006.01) |

(52) U.S. Cl.
CPC ............ *B60J 1/002* (2013.01); *B60J 1/1853* (2013.01); *H05B 3/84* (2013.01)

(58) Field of Classification Search
CPC .... B60J 1/002–003; B60J 1/1853; H05B 3/84
See application file for complete search history.

(56) References Cited

U.S. PATENT DOCUMENTS

| | | | |
|---|---|---|---|
| 4,009,734 | A | 3/1977 | Sullivan |
| 4,300,408 | A | 11/1981 | Yoshifuji |
| 4,920,698 | A | 5/1990 | Friese et al. |

(Continued)

FOREIGN PATENT DOCUMENTS

| | | | | |
|---|---|---|---|---|
| CN | 102149227 A | | 8/2011 | |
| CN | 116513073 A | * | 8/2023 | ............. B60R 13/04 |

(Continued)

*Primary Examiner* — Babajide A Demuren
(74) *Attorney, Agent, or Firm* — HONIGMAN LLP

(57) ABSTRACT

A vehicular window assembly includes a window panel attached at a mounting structure. The window panel has an electrically conductive trace established at a surface of the window panel. The electrically conductive trace includes a positive end electrically connected to a positive terminal at the window panel and a negative end electrically connected to a negative terminal at the window panel. The electrically conductive trace includes a plurality of spaced apart trace segments disposed across the surface of the window panel. The plurality of spaced apart trace segments are electrically connected in series between the positive terminal and the negative terminal. With the vehicular window assembly mounted at the vehicle, a power supply of the vehicle is electrically connected to the positive terminal and the negative terminal to provide electrical power to the electrically conductive trace. Voltage supplied by the power supply is greater than 15 volts.

29 Claims, 4 Drawing Sheets

(56) References Cited

U.S. PATENT DOCUMENTS 4,995,195 A 2/1991 Olberding et al.
5,101,682 A 4/1992 Radisch, Jr. et al.
5,146,712 A 9/1992 Hlavaty
5,245,887 A 9/1993 Tanaka et al.
5,531,046 A 7/1996 Kollar et al.
5,572,376 A 11/1996 Pace
5,839,476 A 11/1998 Blase
5,853,895 A 12/1998 Lewno
6,119,401 A 9/2000 Lin et al.
6,250,175 B1 6/2001 Noetzold
6,494,496 B1 12/2002 Sweeney
6,691,464 B2 2/2004 Nestell et al.
6,955,009 B2 10/2005 Rasmussen
7,003,916 B2 2/2006 Nestell et al.
7,073,293 B2 7/2006 Galer
7,395,631 B2 7/2008 Lahnala
7,400,435 B2 7/2008 Byers et al.
7,437,852 B2 10/2008 Dufour et al.
7,608,949 B2 10/2009 Busch
7,626,749 B2 12/2009 Baur et al.
7,871,272 B2 1/2011 Firman, II et al.
7,900,863 B1 3/2011 Cheng
7,934,342 B2 5/2011 Lahnala
7,963,070 B2 6/2011 Recker
8,042,664 B2 10/2011 Rutkowski et al.
8,069,615 B2 12/2011 Heiman et al.
8,127,498 B2 3/2012 Lahnala
8,151,519 B2 4/2012 Bello et al.
8,250,812 B2 8/2012 Hebert et al.
8,272,168 B2 9/2012 Lahnala
8,402,695 B2 3/2013 Smith et al.
8,595,981 B2 * 12/2013 Lahnala ................ B60J 1/1853
49/413
8,881,458 B2 11/2014 Snider et al.
8,938,914 B2 1/2015 Hulst et al.
9,579,955 B2 2/2017 Snider
10,524,313 B2 12/2019 Snider et al.
12,054,035 B2 8/2024 Snider et al.
2003/0213179 A1 11/2003 Galer
2004/0020131 A1 2/2004 Galer et al.
2006/0107600 A1 5/2006 Nestell et al.
2006/0179966 A1 8/2006 Kuo
2008/0122262 A1 5/2008 Cicala
2008/0127563 A1 6/2008 Tooker
2008/0155902 A1 7/2008 Kaiser
2008/0202032 A1 8/2008 Loidolt
2009/0071284 A1 3/2009 Wen
2009/0235773 A1 9/2009 Wen
2009/0235774 A1 9/2009 Wen
2009/0322705 A1 12/2009 Halsey, IV
2010/0107505 A1 5/2010 Schreiner et al.
2010/0146859 A1 6/2010 Gipson et al.
2010/0154312 A1 6/2010 Gipson et al.
2010/0182143 A1 7/2010 Lynam
2010/0240229 A1 9/2010 Firman, II et al.
2010/0263290 A1 10/2010 Pawloski et al.
2010/0326231 A1 12/2010 Kuo
2011/0030276 A1 2/2011 Smith et al.
2011/0034257 A1 2/2011 Wen
2011/0056140 A1 3/2011 Lewno
2011/0233182 A1 9/2011 Baranski
2011/0262087 A1 10/2011 Bohler et al.
2012/0091113 A1 4/2012 Bennett et al.
2012/0091114 A1 4/2012 Ackerman et al.
2012/0117880 A1 5/2012 Lahnala et al.
2012/0139289 A1 6/2012 Lahnala
2012/0291353 A1 11/2012 Gipson et al.
2013/0068341 A1 3/2013 Wen
2013/0068754 A1 * 3/2013 Ptasienski ................ H05B 3/28
219/541
2013/0174488 A1 7/2013 Snider et al.
2013/0255156 A1 10/2013 Snider
2013/0277352 A1 10/2013 Degen et al.
2013/0283693 A1 10/2013 Huizen et al.
2014/0047772 A1 2/2014 Hulst
2014/0091074 A1 4/2014 Lisinski et al.
2015/0298528 A1 10/2015 Lahnala
2016/0121699 A1 5/2016 Snider et al.
2019/0383084 A1 12/2019 Snider et al.
2020/0084840 A1 3/2020 Kong et al.

FOREIGN PATENT DOCUMENTS

WO 2012037190 A2 3/2012
WO WO-2012065119 A1 * 5/2012 .............. H05B 3/84
WO 2014073546 A1 5/2014

* cited by examiner

VEHICULAR REAR WINDOW ASSEMBLY WITH CONTINUOUS HEATER TRACE

CROSS REFERENCE TO RELATED APPLICATIONS

The present application is a continuation of U.S. patent application Ser. No. 16/947,542, filed Aug. 6, 2024, now U.S. Pat. No. 12,054,035, which claims priority of U.S. provisional application Ser. No. 62/884,188, filed Aug. 8, 2019, which are hereby incorporated herein by reference in their entireties.

FIELD OF THE INVENTION

The present invention relates to movable or slider window assemblies for vehicles and, more particularly to a side or rear slider window assembly for a vehicle having a heating element or feature.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window. It is also known to provide a heating element at the window assembly to defog or defrost the window panels. The window panels typically include respective heater grids that are electrically connected to a power source and are heated responsive to actuation of a user input. Typical heater grids have a single busbar at one side of the heater grid that joins or electrically connects the ends of all of the horizontal traces at that side of the heater grid and have two busbars that each electrically connect the opposite ends of about half of the horizontal traces together at the other side of the heater grid. Such busbars are typically 10 to 20 mm wide to avoid overheating of the busbars during operation of the heater grids.

SUMMARY OF THE INVENTION

The present invention provides a rear slider window assembly that provides for defogging or defrosting of the fixed and movable window panels of the rear slider window assembly. The window assembly of the present invention is operable to heat or defog or defrost the movable window panel irrespective of whether the movable window panel is opened or partially opened or closed. The heating "grid" of each window panel comprises a respective single continuous heater line or trace that has no busbars and that is electrically powered via a higher voltage power supply, such as, for example, a 48 volt power supply.

These and other objects, advantages, purposes and features of the present invention will become apparent upon review of the following specification in conjunction with the drawings.

DESCRIPTION OF THE PREFERRED EMBODIMENTS

Figure 1:
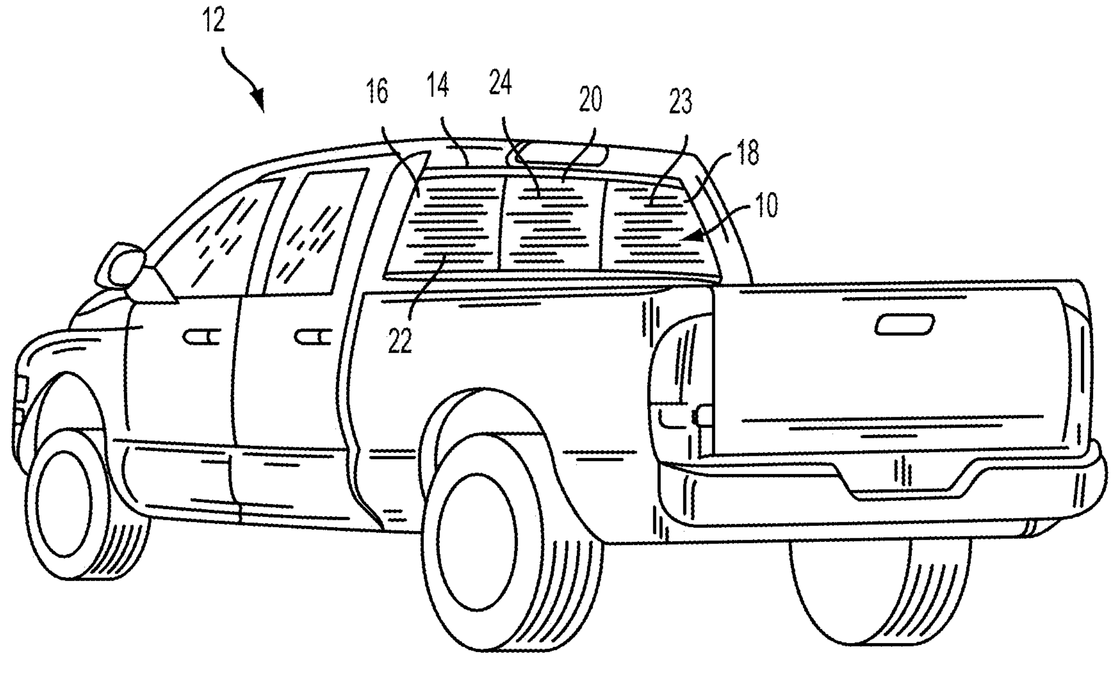
FIG. 1 is a rear perspective view of a pickup truck having a rear slider window assembly in accordance with the present invention.

Referring now to the drawings and the illustrative embodiments depicted therein, a rear slider window assembly 10 of a vehicle 12 (such as a pickup truck or the like) includes a window frame 14, a pair of side fixed window panels 16, 18 and a movable window panel 20 that is movable relative to frame 14 and fixed window panels 16, 18 between an opened position and a closed position. Fixed window panels 16, 18 each include an electrically conductive heater grid 22, 23 or other heating element or electrically operable element established at the window panels (such as at or on an interior surface of the window panels) and movable window panel 20 includes an electrically conductive heater grid or other heating element or electrically operable element 24 established at the window panel (such as at or on an interior surface of the movable window panel).

The heater grids 22, 23 are electrically conductively connected to (or are otherwise in electrical conductive continuity with) a power source of the vehicle and may be powered (such as responsive to a user actuatable input or switch or button of the vehicle or responsive to a sensor or accessory of the vehicle) to heat or defrost or defog the fixed window panels 16, 18. Movable panel heater grid 24 is electrically connected to the power source (and may be electrically connected to electrical terminals or elements at one of the heater grids 22, 23 of the fixed window panels) and may be electrically powered to heat or defrost or defog the movable window panel 20. The heater grids 22, 23, 24 each comprise a single continuous electrically conductive trace that extends back and forth across the respective window panels 16, 18, 20 to provide heating and defrosting/defogging of the window panel, as discussed below. The single continuous electrically conductive traces are powered via a higher voltage power supply (that provides more than 12-15 volts), such as a 24 volt power supply or a 48 volt power supply of the vehicle.

The heater grid 24 of the movable window panel 20 is powered in a manner that allows for heating or defogging or defrosting of the movable window panel irrespective of whether the movable window panel is opened or partially opened or closed. For example, the electrical connection between the vehicle power source or fixed panel heater grid 22 and the movable panel heater grid 24 may comprise a flexible connector or wire or cable, while the fixed panel heater grid 22 may be electrically connected to the other fixed panel heater grid 23 via a jumper wire or cable, such as by utilizing aspects of the rear slider window assemblies described in U.S. Pat. Nos. 9,579,955; 8,881,458 and/or 8,402,695, which are hereby incorporated herein by reference in their entireties.

In the illustrated embodiment, window assembly 10 includes two fixed window panels 16, 18 that are spaced apart so as to define an opening therebetween. Slider or movable window panel 20 is movable along the lower rail and the upper rail of the frame portion 14 to open and close the opening. Optionally, the slider window panel 20 may be disposed at a lower carrier that receives the lower perimeter edge region of the slider window panel 20 therein and that is slidably or movably received in the lower rail of frame portion 14.

Figure 2:
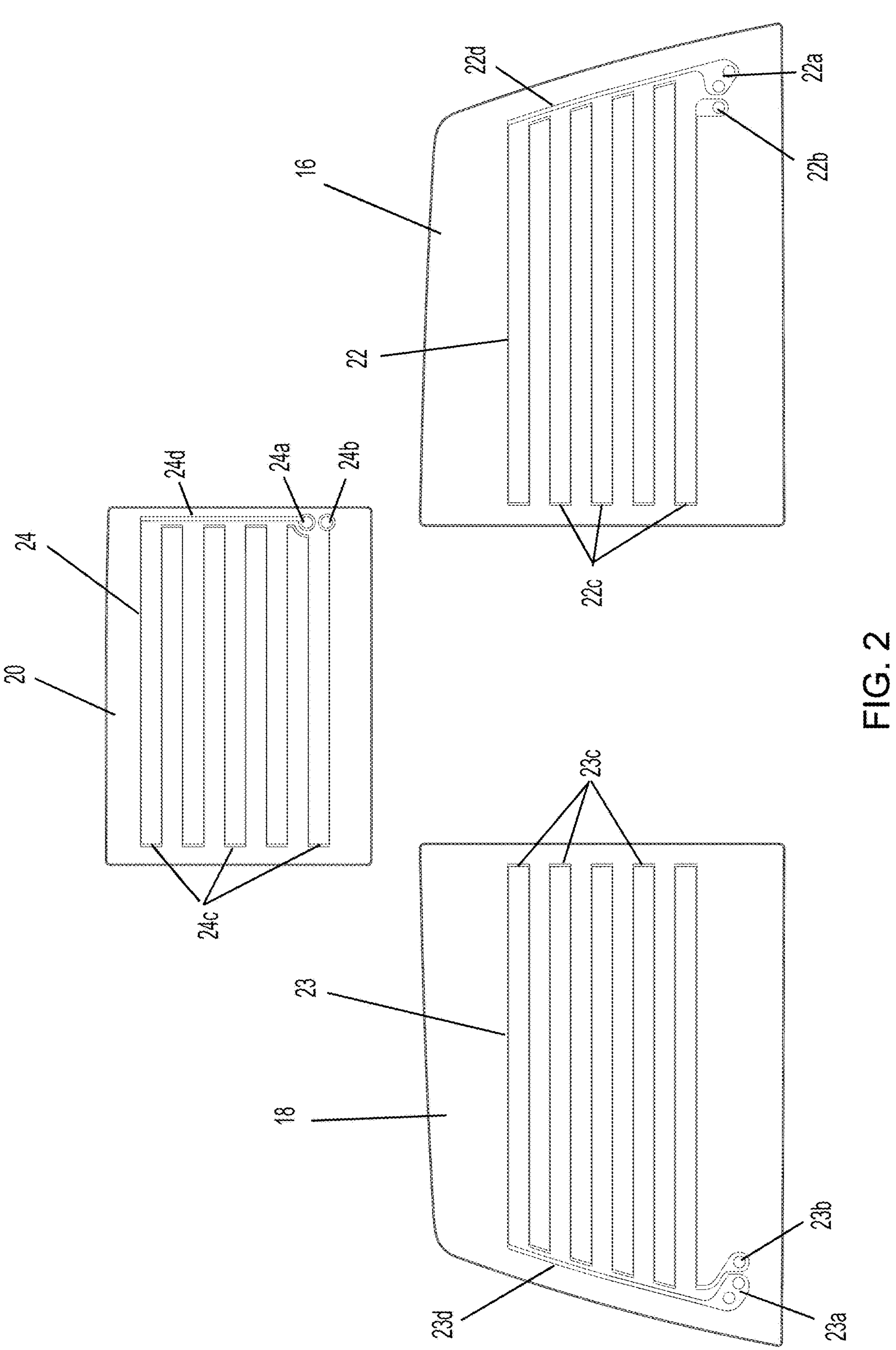
FIG. 2 is a plan view of the window panels of the rear slider window assembly of FIG. 1.

As shown in FIG. 2, the first fixed window panel 16 has the first continuous heater trace 22 disposed thereat (such as by depositing electrically conductive material at the surface of the window panel). The first continuous heater trace is established as horizontal lines or trace segments that extend or traverse back and forth across the window panel with the ends of each adjacent pair of horizontal traces being joined by a respective generally vertical or angled trace segment, and with no busbars or traces joining more than two ends of the horizontal trace segments. Thus, the first continuous heater trace 22 has one end at a positive terminal 22*a* at the fixed window panel 16 and the other or opposite end at a negative terminal 22*b* at the fixed window panel. Electrical current passes from one end of the heater trace 22 to the other to heat the single, continuous heater trace 22 (via the resistance in the electrically conductive material) when it is electrically powered.

Likewise, the second fixed window panel 18 has the second continuous heater trace 23 disposed thereat (such as by depositing electrically conductive material at the surface of the window panel). The second continuous heater trace is established as horizontal lines or trace segments that extend or traverse back and forth across the window panel with the ends of each adjacent pair of horizontal trace segments being joined by a respective generally vertical or angled trace segment, and with no busbars or traces joining more than two ends of the horizontal trace segments. Thus, the second continuous heater trace 23 has one end at a positive terminal 23*a* at the fixed window panel 18 and the other or opposite end at a negative terminal 23*b* at the fixed window panel. Electrical current passes from one end of the heater trace 23 to the other to heat the single, continuous heater trace 23 (via the resistance in the electrically conductive material) when it is electrically powered.

Similarly, the movable window panel 20 has the third continuous heater trace 24 disposed thereat (such as by depositing electrically conductive material at the surface of the window panel). The third continuous heater trace is established as horizontal lines or trace segments that extend or traverse back and forth across the movable window panel with the ends of each adjacent pair of horizontal trace segments being joined by a respective generally vertical or angled trace segment, and with no busbars or traces joining more than two ends of the horizontal trace segments. Thus, the third continuous heater trace 24 has one end at a positive terminal 24*a* at the movable window panel 20 and the other or opposite end at a negative terminal 24*b* at the movable window panel. Electrical current passes from one end of the heater trace 24 to the other to heat the single, continuous heater trace 24 (via the resistance in the electrically conductive material) when it is electrically powered. The terminals 24*a*, 24*b* are electrically connected to one of the terminal sets at the first or second fixed window panel, such as via a flexible jumper wire or cable or the like.

Figure 3:
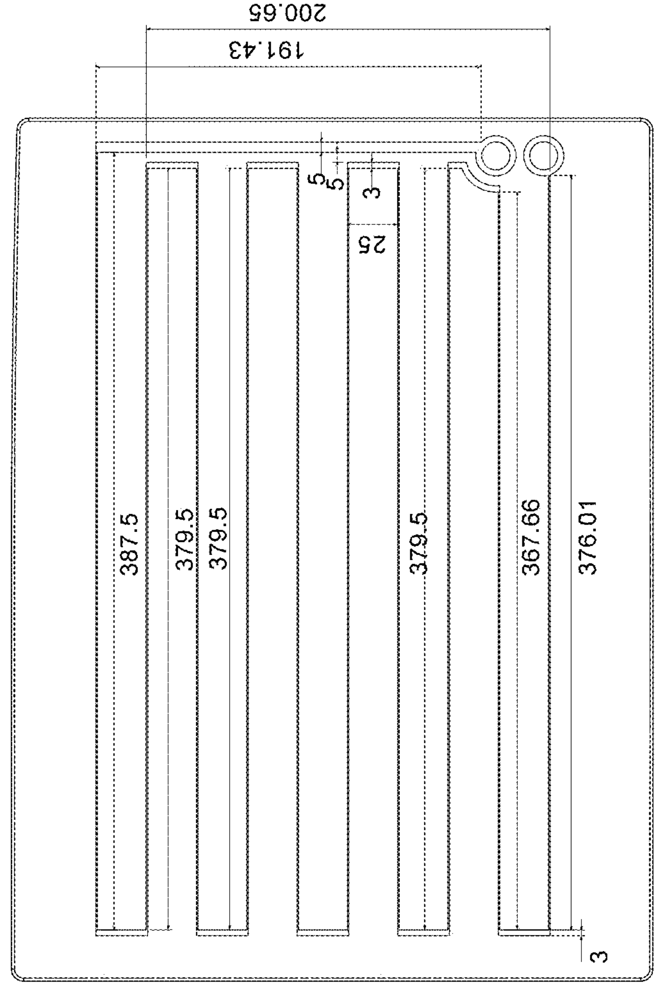
FIG. 3 is a plan view of the movable window panel, showing dimensions of the continuous heater grid trace.
Figure 4:
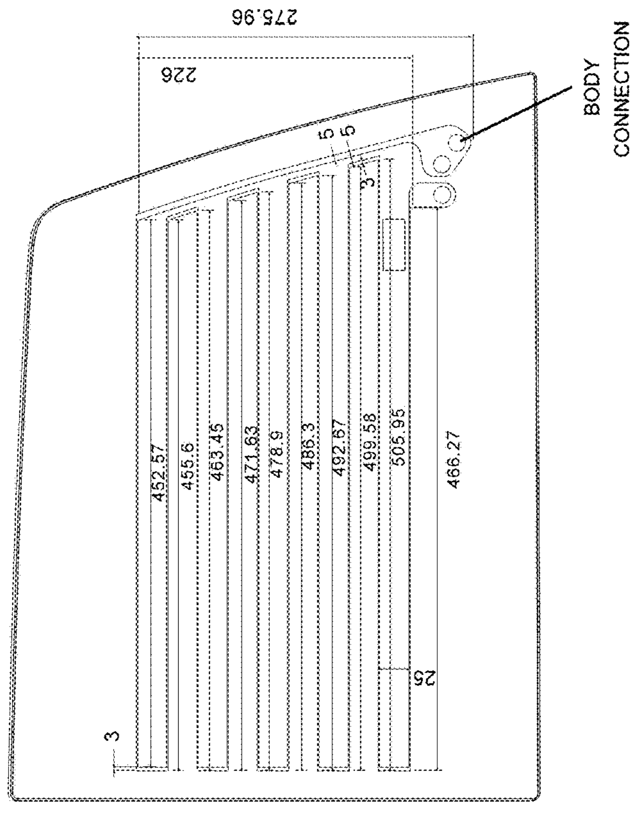
FIG. 4 is a plan view of the fixed window panels, showing dimensions of the respective continuous heater grid traces.
Figure 4:
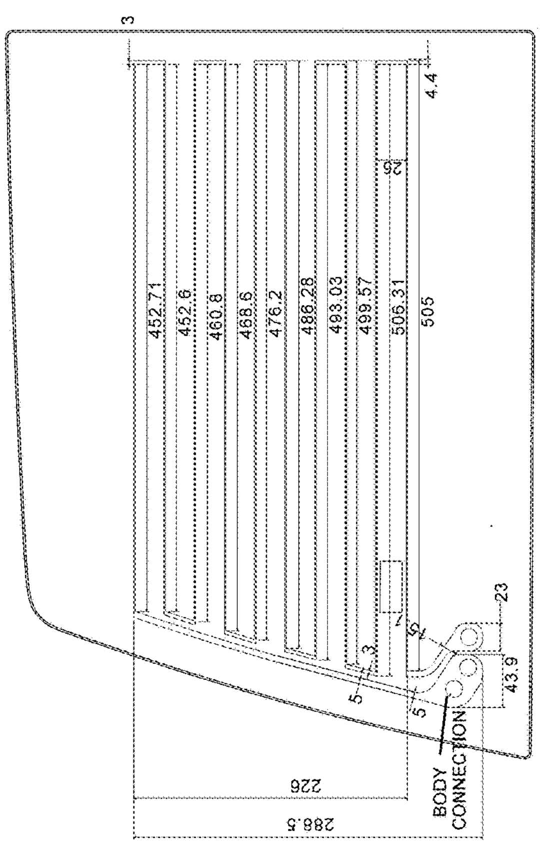

The conductive traces 22, 23, 24 are dimensioned to have a reduced width at their end connecting portions or partial busbars 22*c*, 23*c*, 24*c* at either side of the respective grid (the portions that electrically connect between ends of adjacent horizontal traces). For example, the width dimension of the trace portions or segments that join ends of adjacent horizontal traces or trace segments may be less than 5 mm, such as about 3 mm (as shown in FIGS. 3 and 4), while the width of the busbar 22*d*, 23*d*, 24*d* that electrically connects one of the terminals to a distal horizontal trace or trace segment of the respective heater grid may have a width of, for example, about 5 mm (as shown in FIGS. 3 and 4).

The increased voltage of the power supply (to 48 volts) allows the heater grids to draw less than 3 amps (such as about 1.5 amps to about 2 amps) during operation of the heater grids, such that the connecting portions or partial busbars can have reduced thickness and will not overheat during operation of the heater grids.

The movable or slider window panel may be movable such as via manual pushing or pulling at the window panel or in response to actuation of a drive motor of a drive motor assembly or system, which may move cables or the like to impart horizontal movement of the slider window panel along the rails. Optionally, the drive motor assembly may utilize aspects of the drive assemblies of the types described in U.S. Pat. Nos. 4,920,698; 4,995,195; 5,146,712; 5,531,046; 5,572,376; 6,119,401; 6,955,009 and/or 7,073,293, and/or U.S. Publication Nos. US-2019-0383084; US-2008-0127563 and/or US-2004-0020131, which are all hereby incorporated herein by reference in their entireties.

Optionally, the window assembly or assemblies of the present invention may utilize aspects of the window assemblies described in U.S. Pat. Nos. 8,402,695; 8,322,073; 7,838,115; 7,332,225; 7,073,293; 7,003,916; 6,846,039; 6,691,464; 6,319,344; 6,068,719 and 5,853,895, and/or U.S. Publication Nos. US-2013-0174488; US-2011-0056140; US-2006-0107600; US-2008-0127563; US-2004-0020131 and/or US-2003-0213179, which are hereby incorporated herein by reference in their entireties. Although shown and described as a horizontally movable center window that moves relative to a pair of opposite side windows (such as for applications at the rear of a cab of a pickup truck or the like), it is envisioned that the present invention is applicable to other types of movable window assemblies, such as horizontally movable window panels that move relative to a single fixed window panel and/or frames (such as for a rear or side opening of a vehicle or the like), and/or such as vertically movable window panels that move relative to one or more fixed panels and/or frames (such as for a rear or side opening of a vehicle or the like), while remaining within the spirit and scope of the present invention.

Although shown and described as a rear slider window assembly, such as for a pickup truck, aspects of the present invention are suitable for use on other vehicular window assemblies, such as rear window assemblies of vehicles that are fixed window panels (having mounting structure that is configured to mount or attach or bond at an opening at a rear of a vehicle) or that are openable window panels (such as hinged liftgates or the like). The single continuous electrically conductive trace is disposed at a surface of the window panel with a plurality of electrically conductive traces disposed across the window panel and with a plurality of connecting traces connecting ends of only two adjacent traces. The single continuous electrically conductive trace is powered via a higher voltage power supply (that provides more than 12-15 volts), such as a 24 volt power supply or a 48 volt power supply.

Changes and modifications to the specifically described embodiments may be carried out without departing from the principles of the present invention, which is intended to be limited only by the scope of the appended claims, as interpreted according to the principles of patent law.

The invention claimed is:

1. A vehicular window assembly, the vehicular window assembly comprising:

a mounting structure configured to mount the vehicular window assembly at a vehicle;

a window panel that is attached at the mounting structure;

wherein the window panel has an electrically conductive trace established at a surface of the window panel;

wherein the electrically conductive trace comprises (i) a positive end electrically connected to a positive terminal at the window panel and (ii) a negative end electrically connected to a negative terminal at the window panel;

wherein the electrically conductive trace comprises a plurality of spaced apart trace segments disposed across the surface of the window panel;

wherein the plurality of spaced apart trace segments are electrically connected in series between the positive terminal at the window panel and the negative terminal at the window panel;

wherein the electrically conductive trace comprises a plurality of connecting trace segments that electrically connect adjacent ends of adjacent spaced apart trace segments of the plurality of spaced apart trace segments, and wherein the plurality of spaced apart trace segments and the plurality of connecting trace segments are electrically connected in series between the positive terminal at the window panel and the negative terminal at the window panel;

wherein each connecting trace segment of the plurality of connecting trace segments electrically connects to adjacent ends of only two adjacent trace segments of the plurality of spaced apart trace segments; and wherein, with the vehicular window assembly mounted at the vehicle, a power supply of the vehicle is electrically connected to the positive terminal and the negative terminal at the window panel to provide electrical power to the electrically conductive trace, and wherein voltage supplied by the power supply of the vehicle is greater than 15 volts.

2. The vehicular window assembly of claim 1, wherein a width dimension of each of the connecting trace segments is less than 5 mm.

3. The vehicular window assembly of claim 1, wherein a width dimension of each of the connecting trace segments is less than 3 mm.

4. The vehicular window assembly of claim 1, wherein the power supply of the vehicle is a 24-volt power supply.

5. The vehicular window assembly of claim 1, wherein the power supply of the vehicle is a 48-volt power supply.

6. The vehicular window assembly of claim 1, wherein current draw at the electrically conductive trace is less than 2 amps.

7. A vehicular rear slider window assembly, the vehicular rear slider window assembly comprising:

a fixed window panel;

a movable window panel;

an upper rail and a lower rail disposed at the fixed window panel;

wherein the fixed window panel comprises an opening, and wherein the movable window panel is movable along the upper rail and the lower rail between (i) a closed position where the movable window panel is disposed at the opening and (ii) an opened position where the movable window panel is disposed at least partially along the fixed window panel;

wherein the fixed window panel has a first electrically conductive trace established at a surface of the fixed window panel;

wherein the movable window panel has a second electrically conductive trace established at a surface of the movable window panel;

wherein the first electrically conductive trace comprises (i) a positive end electrically connected to a positive terminal at the fixed window panel and (ii) a negative end electrically connected to a negative terminal at the fixed window panel;

wherein the first electrically conductive trace comprises a plurality of spaced apart first trace segments disposed across the surface of the fixed window panel;

wherein the plurality of spaced apart first trace segments are electrically connected in series between the positive terminal at the fixed window panel and the negative terminal at the fixed window panel;

wherein the second electrically conductive trace comprises (i) a positive end electrically connected to a positive terminal at the movable window panel and (ii) a negative end electrically connected to a negative terminal at the movable window panel;

wherein the second electrically conductive trace comprises a plurality of spaced apart second trace segments disposed across the surface of the movable window panel;

wherein the plurality of spaced apart second trace segments are electrically connected in series between the positive terminal at the movable window panel and the negative terminal at the movable window panel;

wherein, with the vehicular rear slider window assembly disposed at a vehicle, a power supply of the vehicle is electrically connected to (i) the positive terminal at the fixed window panel and to the negative terminal at the fixed window panel to provide electrical power to the first electrically conductive trace, and (ii) the positive terminal at the movable window panel and to the negative terminal at the movable window panel to provide electrical power to the second electrically conductive trace; and wherein voltage supplied by the power supply of the vehicle is greater than 15 volts.

8. The vehicular rear slider window assembly of claim 7, wherein the first electrically conductive trace comprises a plurality of first connecting trace segments that electrically connect adjacent ends of adjacent spaced apart first trace segments of the plurality of spaced apart first trace segments, and wherein the plurality of spaced apart first trace segments and the plurality of first connecting trace segments are electrically connected in series between the positive terminal at the fixed window panel and the negative terminal at the fixed window panel.

9. The vehicular rear slider window assembly of claim 8, wherein each first connecting trace segment of the plurality of first connecting trace segments electrically connects to adjacent ends of only two adjacent first trace segments of the plurality of spaced apart first trace segments.

10. The vehicular rear slider window assembly of claim 8, wherein a width dimension of each of the first connecting trace segments is less than 5 mm.

11. The vehicular rear slider window assembly of claim 8, wherein a width dimension of each of the first connecting trace segments is less than 3 mm.

12. The vehicular rear slider window assembly of claim 7, wherein the second electrically conductive trace comprises a plurality of second connecting trace segments that electrically connect adjacent ends of adjacent spaced apart second trace segments of the plurality of spaced apart second trace segments, and wherein the plurality of spaced apart second trace segments and the plurality of second connecting trace segments are electrically connected in series between the positive terminal at the movable window panel and the negative terminal at the movable window panel.

13. The vehicular rear slider window assembly of claim 12, wherein each second connecting trace segment of the plurality of second connecting trace segments electrically connects to adjacent ends of only two adjacent second trace segments of the plurality of spaced apart second trace segments.

14. The vehicular rear slider window assembly of claim 7, wherein current draw at the first electrically conductive trace is less than 2 amps.

15. The vehicular rear slider window assembly of claim 7, wherein electrical power is provided to the second electrically conductive trace via a jumper wire that electrically connects positive and negative terminals of the fixed window panel to the positive terminal and the negative terminal of the movable window panel.

16. The vehicular rear slider window assembly of claim 7, wherein the power supply of the vehicle is a 24-volt power supply.

17. The vehicular rear slider window assembly of claim 7, wherein the power supply of the vehicle is a 48-volt power supply.

18. A vehicular rear slider window assembly, the vehicular rear slider window assembly comprising:

a first fixed window panel;

a second fixed window panel spaced apart from the first fixed window panel to establish an opening therebetween;

a frame portion fixed relative to the first fixed window panel and the second fixed window panel, wherein the frame portion comprises an upper rail and a lower rail;

a movable window panel;

wherein the movable window panel is movable along the upper rail and the lower rail between (i) a closed position where the movable window panel is disposed at the opening and (ii) an opened position where the movable window panel is disposed at least partially along the first fixed window panel;

wherein the first fixed window panel has a first electrically conductive trace established at a surface of the first fixed window panel;

wherein the second fixed window panel has a second electrically conductive trace established at a surface of the second fixed window panel;

wherein the movable window panel has a third electrically conductive trace established at a surface of the movable window panel;

wherein the first electrically conductive trace comprises (i) a positive end electrically connected to a positive terminal at the first fixed window panel and (ii) a negative end electrically connected to a negative terminal at the first fixed window panel;

wherein the first electrically conductive trace comprises a plurality of spaced apart first trace segments disposed across the surface of the first fixed window panel;

wherein the plurality of spaced apart first trace segments are electrically connected in series between the positive terminal at the first fixed window panel and the negative terminal at the first fixed window panel;

wherein the second electrically conductive trace comprises (i) a positive end electrically connected to a positive terminal at the second fixed window panel and (ii) a negative end electrically connected to a negative terminal at the second fixed window panel;

wherein the second electrically conductive trace comprises a plurality of spaced apart second trace segments disposed across the surface of the second fixed window panel;

wherein the plurality of spaced apart second trace segments are electrically connected in series between the positive terminal at the second fixed window panel and the negative terminal at the second fixed window panel;

wherein the third electrically conductive trace comprises (i) a positive end electrically connected to a positive terminal at the movable window panel and (ii) a negative end electrically connected to a negative terminal at the movable window panel;

wherein the third electrically conductive trace comprises a plurality of spaced apart third trace segments disposed across the surface of the movable window panel;

wherein, with the vehicular rear slider window assembly disposed at a vehicle, a power supply of the vehicle is electrically connected (i) to the positive terminal at the first fixed window panel and to the negative terminal at the first fixed window panel to provide electrical power to the first electrically conductive trace, (ii) to the positive terminal at the second fixed window panel and to the negative terminal at the second fixed window panel to provide electrical power to the second electrically conductive trace, and (iii) to the positive terminal at the movable window panel and to the negative terminal at the movable window panel to provide electrical power to the third electrically conductive trace;

wherein voltage supplied by the power supply of the vehicle is greater than 15 volts; and wherein electrical power is provided to the third electrically conductive trace of the movable window panel via a jumper wire that electrically connects positive and negative terminals of the first fixed window panel to the positive terminal and the negative terminal of the movable window panel.

19. The vehicular rear slider window assembly of claim 18, wherein the first electrically conductive trace comprises a plurality of first connecting trace segments that electrically connect adjacent ends of adjacent spaced apart first trace segments of the plurality of spaced apart first trace segments, and wherein the plurality of spaced apart first trace segments and the plurality of first connecting trace segments are electrically connected in series between the positive terminal at the first fixed window panel and the negative terminal at the first fixed window panel, and wherein the second electrically conductive trace comprises a plurality of second connecting trace segments that electrically connect adjacent ends of adjacent spaced apart second trace segments of the plurality of spaced apart second trace segments, and wherein the plurality of spaced apart second trace segments and the plurality of second connecting trace segments are electrically connected in series between the positive terminal at the second fixed window panel and the negative terminal at the second fixed window panel.

20. The vehicular rear slider window assembly of claim 19, wherein each first connecting trace segment of the plurality of first connecting trace segments electrically connects to adjacent ends of only two adjacent first trace segments of the plurality of spaced apart first trace segments, and wherein each second connecting trace segment of the plurality of second connecting trace segments electrically connects to adjacent ends of only two adjacent second trace segments of the plurality of spaced apart second trace segments.

21. The vehicular rear slider window assembly of claim 19, wherein a width dimension of each of the first connecting trace segments is less than 5 mm.

22. The vehicular rear slider window assembly of claim 19, wherein a width dimension of each of the first connecting trace segments is less than 3 mm.

23. The vehicular rear slider window assembly of claim 18, wherein the plurality of spaced apart third trace segments are electrically connected in series between the positive terminal at the movable window panel and the negative terminal at the movable window panel.

24. The vehicular rear slider window assembly of claim 23, wherein the third electrically conductive trace comprises a plurality of third connecting trace segments that electrically connect adjacent ends of adjacent spaced apart third trace segments of the plurality of spaced apart third trace segments, and wherein the plurality of spaced apart third trace segments and the plurality of third connecting trace segments are electrically connected in series between the positive terminal at the movable window panel and the negative terminal at the movable window panel.

25. The vehicular rear slider window assembly of claim 24, wherein each third connecting trace segment of the plurality of third connecting trace segments electrically connects to adjacent ends of only two adjacent third trace segments of the plurality of spaced apart third trace segments.

26. The vehicular rear slider window assembly of claim 18, wherein current draw at the first electrically conductive trace is less than 2 amps.

27. The vehicular rear slider window assembly of claim 18, wherein electrical power is provided to the second electrically conductive trace via a second jumper wire that electrically connects positive and negative terminals of the first fixed window panel to the positive terminal and the negative terminal of the second fixed window panel.

28. The vehicular rear slider window assembly of claim 18, wherein the power supply of the vehicle is a 24-volt power supply.

29. The vehicular rear slider window assembly of claim 18, wherein the power supply of the vehicle is a 48-volt power supply.

* * * * *